INVENTOR
Perley R. Glass
By his Attorney
Hardworth Davis

Oct. 10, 1933.　　　P. R GLASS　　　1,929,549

WORK PRESENTING DEVICE FOR MARKING MACHINES

Original Filed July 13, 1927　　4 Sheets-Sheet 4

INVENTOR
Perley R. Glass
By his Attorney,
Harlow M. Davis

Patented Oct. 10, 1933

1,929,549

UNITED STATES PATENT OFFICE 1,929,549

WORK-PRESENTING DEVICE FOR MARKING MACHINES

Perley R. Glass, Wayland, Mass., assignor to United Shoe Machinery Corporation, Paterson, N. J., a corporation of New Jersey Original application July 13, 1927, Serial No. 205,504. Divided and this application September 10, 1930. Serial No. 480,972

9 Claims. (Cl. 101—408)

This invention relates to machines for marking, stamping or embossing pieces of work, such as parts of boots and shoes, and is herein illustrated as embodied in a machine of the type disclosed in United States Letters Patent No. 1,779,091, granted October 21, 1930, for improvements in Marking machines, of which this application is a division.

Marking machines of the types which are frequently termed "embossing machines" apply a heated die to the back side of a pigment-carrying ribbon, such as a paper strip, and as the die forces the strip into contact with the work, the pigment is transferred to the work in the desired design.

In the use of a marking machine of the type referred to for stamping small pieces of work, such, for example, as the small, thin pieces known as "heel pods" and used as lining pieces above the heel seats of completed shoes, it has been found difficult to present the work pieces to the stamping die rapidly and in correct relation to the die without danger of injury to the operator's fingers by crushing or by burning. Moreover, the work pieces to be marked are commonly very flexible and not infrequently flimsy, and the desired marking often occupies a considerable portion of the area of the given piece of work. In view of these conditions, the marking machine illustrated as embodying the present invention comprises improved mechanism for transferring work pieces successively from a loading station to an operating station, at which they are marked, and thence to a discharge station. In the illustrated machine, an intermittently rotated carrier is surrounded by an annular table, the work pieces being partially supported by the annular table and overlapping the carrier. On the illustrated carrier are mounted a plurality of clamping devices, each of which is arranged to engage the edge of a piece of work supported upon the annular table. As the carrier is intermittently rotated, a given piece of work is slid along the annular table and positioned on a work support for a marking operation. As illustrated, the clamping devices are adjustable radially of the carrier. This allows different shapes and sizes of work pieces to be handled readily. Preferably, a suitable gage is provided at the loading station, so that the position of each piece of work with respect to its clamping device, and hence with respect to the stamping die, may be accurately determined. Preferably too, the rotatable carrier substantially fills the space within the annular table, and the carrier and the table together cover the driving mechanism for the carrier.

It is desirable that the clamping devices be operated automatically in order to facilitate the introduction of work in and its removal from the machine, and, accordingly, the illustrated machine has provision for such automatic operation of the work-clamping devices. To this end and in accordance with a feature of the invention, the preferred construction and arrangement are such that each clamping device is held open at the loading station for the introduction of work while the carrier is stationary, and is closed upon the work before the carrier is actuated to transfer the piece of work away from the loading station. Thus, the introduction and positioning of work are rendered certain and convenient.

These and other features of the invention may best be understood by a consideration of the following description taken in connection with the accompanying drawings, in which Fig. 1 is a perspective view of a marking machine embodying my invention with the usual hand wheel removed;

Figure 1:
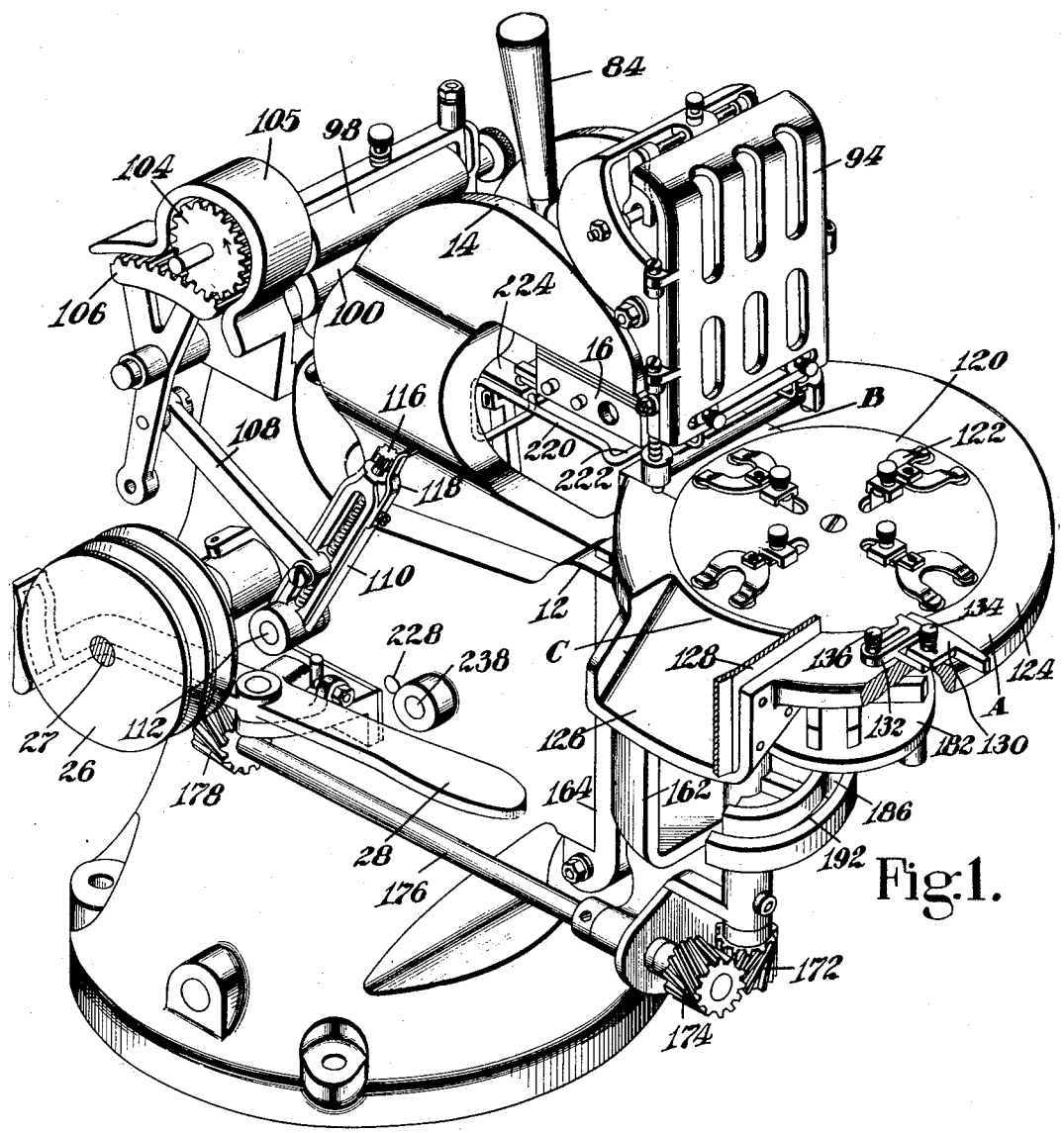

The invention is herein illustrated as embodied in a Marking machine of the type disclosed in Letters Patent of the United States No. 1,695,852, granted Dec. 18, 1928 upon the application of P. R. Glass and H. D. Elliott, to which reference may be had for descriptions of portions of the machine not fully set forth herein. As in that machine, the work is supported in the illustrated machine upon a tiltably mounted work table 10 which is resiliently supported in a frame 12 arranged to provide guides for a vertically movable goose-neck shaped slidable die carrying head 14, on the overhanging forward end of which a die-carrying block 16 is provided. Reciprocation of this die-carrying head is effected by means of a toggle 18 arranged to be straightened by a link 20 connected to a cam operated lever 22. This lever is actuated by a suitably shaped cam upon a drive shaft 24 journaled in the frame of the machine and connected by gears 25 to a motor shaft 27 provided with fast and loose pulleys 26 to which the belt is guided by means of a manually operable shift lever 28.

In order that the degree of pressure to be applied to the work may be exactly determined and adjusted, the spindle 30 forming a bearing in the frame for the upper link of the toggle 18 is provided with an eccentric portion 32 and means embodying a hand wheel 40 and more fully illustrated in the parent application to which reference has been made above are provided for adjusting the position of this eccentric portion so that the pressure imparted by the toggle may be readily varied accurately.

The die-carrying block 16 contains a heating cartridge and is recessed to receive overlapping meshing pinions 52 and 54 which are journaled therein. Guideways are provided at the lower side of the block which receive a sliding forward clamping plate 60 and a sliding rear clamping plate 64. Means including said pinions are provided for interconnecting the two clamping plates for equal and opposite movement, and an operating handle 84 is connected to the rear clamping plate and normally urged by a spring-pressed plunger 86 to hold the clamping members 60 and 64 in engagement with a die 72. Movement of one of the plates by means of the operating handle 84 is effective simultaneously to separate both of the plates to allow removal of the die 72. Whenever a die is placed in position to be clamped it will be exactly centered with respect to the work supporting table 10 without great care on the part of the operator. The temperature of the die-carrying member 16 and hence of the die 72 is determined by an adjustable thermostatically operated control member 81. As in the machine disclosed in the previously mentioned Patent No. 1,695,582, the pigment-carrying strip 90 is supplied from a roll 92 mounted in a casing 94 and is guided downwardly and thence rearwardly around a spring-pressed guide rod 96 to feed rolls 98 and 100. These rolls are actuated by means of a pinion 104 within a casing 105 and meshing with a segment 106 connected by a link 108 to an oscillatable arm 110, carried on a shaft 112.

Figure 5:
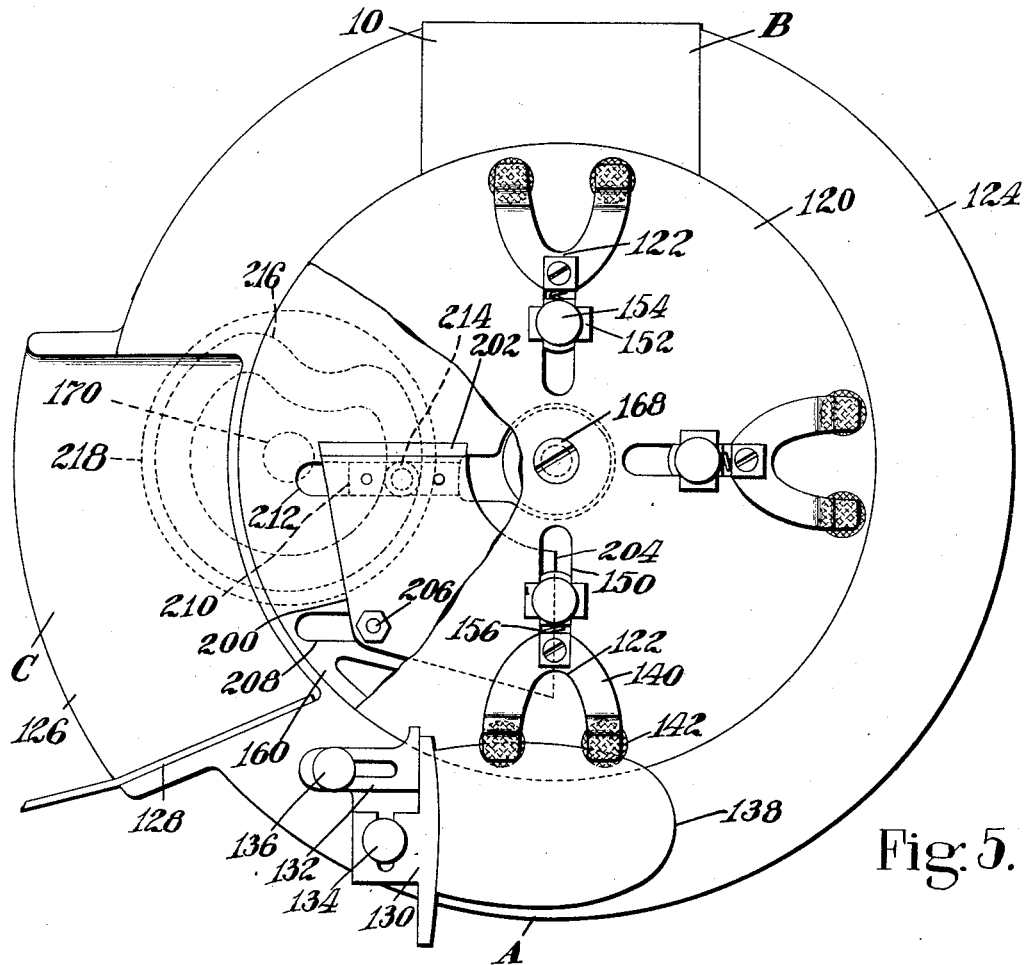
Fig. 5 is a plan view of the work carrier and the work table of the machine.

In order that small relatively thin and flimsy pieces of work may be more readily presented to the machine, there is provided a novel work presenting device which comprises a rotatable work carrier 120 having a plurality of work-clamping devices 122. This rotatable carrier is surrounded by a smooth annular table 124 extending from a loading station A at the front of the machine to an operating position B and thence to a discharge position C where the annular table is cut away to provide a discharge chute 126 on the near side of which there is attached a stop-plate 128, the rotatable carrier substantially filling the space within the annular table. The arrangement is such, as will be later described, that the clamps automatically release a piece of work as they approach the discharge station C and normally each piece of work will be thrown out by centrifugal force and slide down the chute 126 into a suitable receptacle (not shown). In case, however, any piece of work is caught in the clamping member, it will be brushed out of the clamp and into the chute by engagement with the stop-plate 128. At the loading station, there is provided a gage 130 adjustably held on a support 132 by a screw 134 and said support 132 is in turn adjustably held on the annular table by a screw 136, thus providing for the adjustment of the position of the gage 130 both from front to back and laterally. The particular gage 130 which is illustrated herein has its edge curved to fit the forward edge of a heel pod 138 (Fig. 5), but it will be understood that if other differently shaped pieces are to be treated by the machine, then another gage may be substituted which will be properly shaped to assist the operator in the positioning of such pieces.

Figure 7:
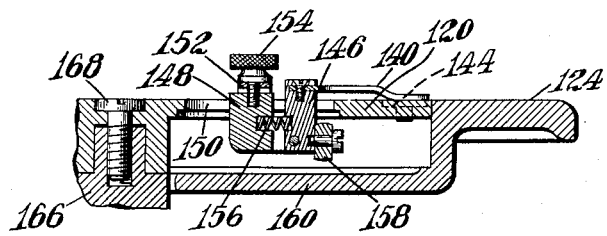
Fig. 7 is a radial section through the carrier, the annular table, and one of the clamping devices.

Each of the clamping devices 122 upon the work carrier 120 comprises a U-shaped clamping member 140 made of spring steel and having its free outer ends bent downwardly to overlie roughened spots 142 upon the work carrier 120. These roughened spots 142 are provided by means of studs 144 (Fig. 7) inserted in the surface of the table. Each U-shaped member 140 is centrally supported in a pivoted member 146 which is carried on an adjustable block 148 capable of sliding radially in the carrier 120 in a slot 150. Each adjustable block 148 is clamped in adjusted position by means of a crossbar 152, the downturned ends of which are brought into gripping engagement with the upper surface of the work carrier 120 by means of a thumbscrew 154. A spring 156 is interposed between each of the blocks 148 and its pivoted member 146 normally to bias the free outer ends of the U-shaped member 140 into engagement with a piece of work interposed between said ends and the upper surface of the work carrier. Each pivoted member 146 is provided with an anti-friction roll 158 for a purpose to be later explained. It will be seen that the particular construction of the clamping devices 122 which has been described provides for a firm engagement with the margin of a piece of work, such as the heel pod 138, which is largely supported upon the annular table 124 and overlaps the carrier 120. This manner of engagement leaves the majority of the surface of the piece of work free for the action of the stamping die and at the same time provides a device by means of which the position of each piece of work with respect to the stamping die may be exactly determined. The radial adjustment of each clamping device allows its use with differently shaped pieces of work.

Figure 2:
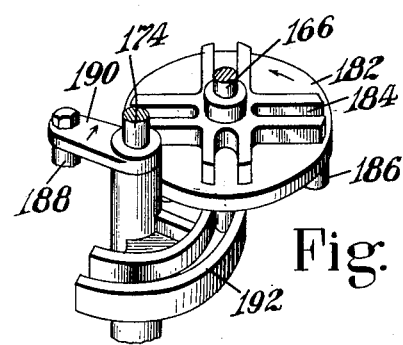
Fig. 2 is a detail of the work carrier operating mechanism.
Figure 3:
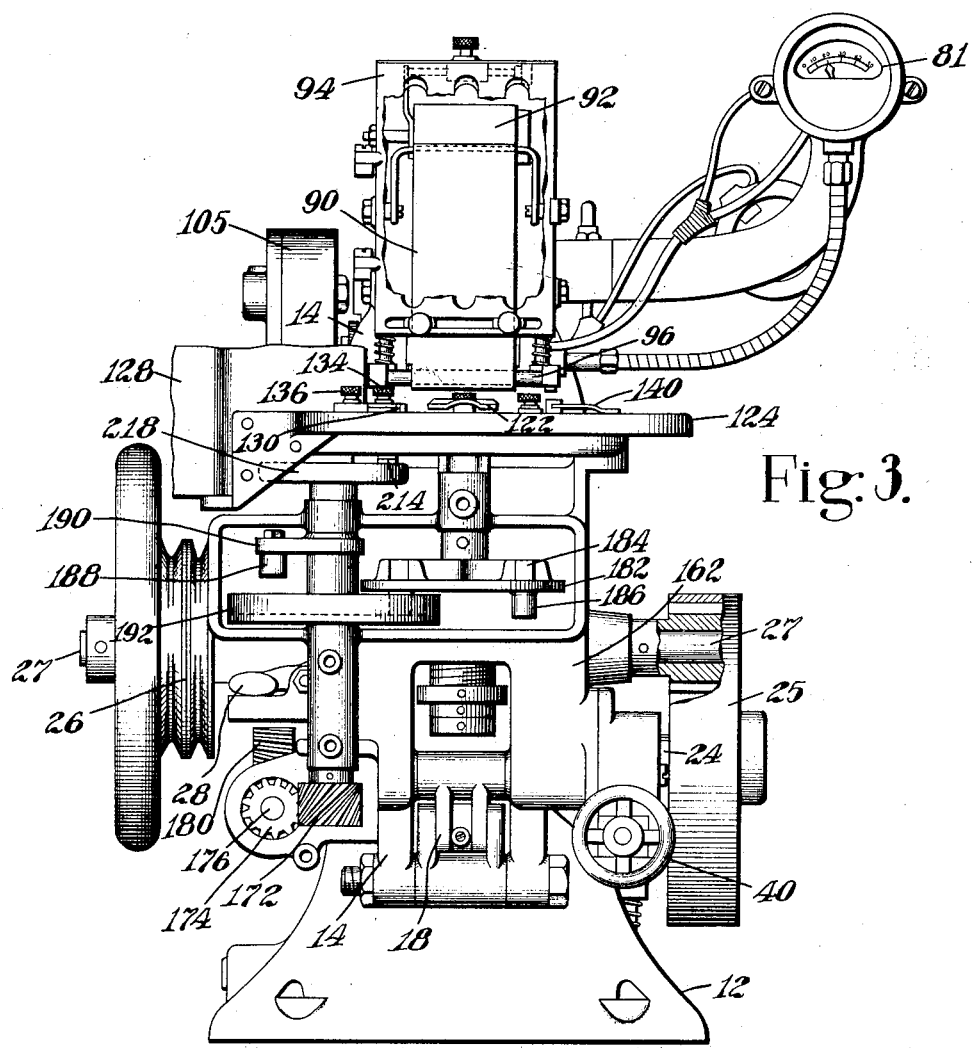
Fig. 3 is a front elevation of the machine.
Figure 4:
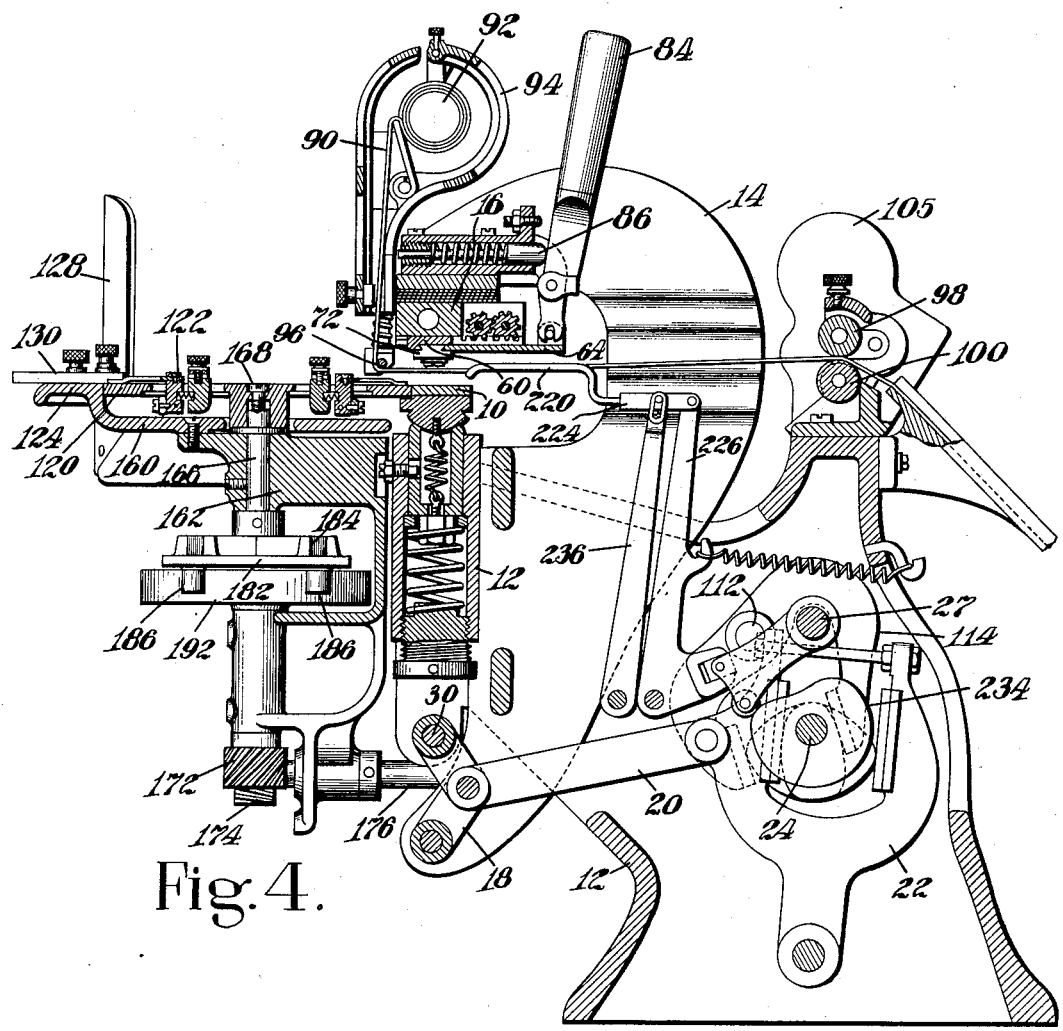
Fig. 4 is a vertical section through the machine from front to back intersecting the axis of the rotatable work carrier.

The annular table 124 including the chute 126 is made as a casting which is provided with a bottom member 160 forming a closure to cover and protect the parts of the clamping members which are below the work carrier 120. By means of this bottom member 160, the table 124 is attached to a casting 162 which in turn is attached to the machine by being secured to a cover plate 164 (Fig. 1) which cooperates with the frame 12 to guide the vertically reciprocable die-carrying head 14. The casting 162 is shaped (Fig. 4) to provide bearings for a vertical carrier shaft 166, to the upper end of which the work carrier 120 is attached by means of a screw 168. The casting 162 also provides bearings for a parallel cam shaft 170 (Fig. 5) on the lower end of which there is provided a skew gear 172 (Fig. 1) meshing with a similar gear 174 at the forward end of a counter shaft 176 the rear end of which is connected by suitable gears 178 and 180 (Fig. 3) to the drive shaft 24 of the machine. The connection between the cam shaft 170 and the carrier shaft 166 is such as to transform the continuous rotation of the cam shaft 170 into an intermittent rotation of the work carrier 120. To this end a form of Geneva movement (Figs. 2 and 3) is provided which includes a plate 182, the upper surfaces of which is provided with four radial grooves 184 corresponding in number to the number of clamping devices on the carrier. The lower surface of the plate 182 is provided with a corresponding number of locking rolls 186. On the cam shaft 170, on the other hand, there is provided an actuating roll 188 at the outer end of an arm 190 and this actuating roll 188 engages in each of the grooves 184 to give the plate 182 and hence the work carrier 120 one-quarter of a revolution every time the cam shaft 170 rotates. It will be noted that the work carrier 120 remains at rest during a considerable part of the rotation of the cam shaft 170 and the speed of this shaft is so controlled by a proper design of its driving gears that plenty of time is allowed for the placing of the work in the work clamp at the loading station A while the work carrier 120 is stationary and for the operation of the stamping die at the operating station B. In order that the work carrier 120 may be held positively against rotation during an interval of rest, a grooved cam quadrant 192 is provided upon the cam shaft 170 which is arranged to engage first one and then two of the locking rolls 186 during the time that the actuating roll 180 is out of engagement with one of the grooves 184. The extent of the quadrant 192 is such that it releases the plate 182 just as soon as the actuating roll 188 is ready to turn the plate 182. A positive drive is thus furnished which provides for rotation of the work carrier intermittently through 90 degrees to bring another piece of work to the operating station B and which is also arranged to hold the work carrier positively against rotation during the operation of the stamping die.

Figure 6:
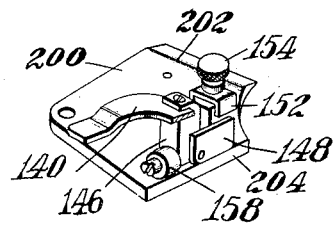
Fig. 6 is a detailed perspective showing the cam plate which controls the clamping device.

Since each of the U-shaped clamping members 140 is normally biased by the spring 156 into engagement with a piece of work on the carrier, it is necessary positively to open each clamping member as it comes to the discharge station so that a work piece will be discharged from the carrier and so that the work clamp will be open to allow the convenient insertion of another piece of work at the loading station A. Accordingly, there is provided on the upper surface of the bottom plate 160 of the annular table an irregularly shaped cam plate 200 (Figs. 5 and 6), the rear edge of which is beveled at 202 so that the roller 158 of the clamping device 122 which is approaching the discharge station C will ride up over the beveled edge 202 and thereby positively open the clamp. Since this releases the clamp while the work carrier is still in motion, the centrifugal force imparted to each piece of work will tend to and usually will throw it out into the chute 126. It will be noted that the forward square edge 204 of the cam plate 200 lies along a radius adjacent to the loading station A. It thus holds open that clamping device 122, which is at the loading station, to allow the interposition of a piece of work between the carrier 120 and the forward ends of the clamping member 140. In order that the clamp may be closed just before the work carrier 120 starts to move so that the operator can be sure that the work is clamped in correct position on the carrier, means are provided for shifting the cam plate 200 laterally to withdraw it from beneath the roller of the corresponding clamping member at the loading station before the carrier is started. To this end the cam plate 200 is guided by means of a stud 206 passing through a slot 208 in the bottom plate 160 of the annular table and is also provided with a block 210 slidably engaging another slot 212 in said bottom member. Upon the under side of this block 210 a roll 214 is provided which is arranged to engage a groove 216 of a cam member 218 secured to the upper end of the cam shaft 170. Accordingly, the actuation of the cam plate 200 is in timed relation to and precedes each movement of the work carrier 120 just as the movements of the carrier 120 are in timed relation to and precede each operation of the stamping die. The cam plate 200 is reciprocated once for every rotation of the cam shaft and hence once for every quarter rotation of the carrier.

It is found in some instances, and particularly when pieces of work are fed automatically by means of the mechanism shown and described herein, desirable positively to separate the pieces of work from the pigment-carrying strip 90 after impressions have been made so that the feeding of the work may not be slowed down by reason of any adhesion between the two and so that there may be no danger of tearing the strip 90 as the pieces of work are removed from the machine. With this in view a looped stripper 220 is supported and moved across the path of movement of the die to a forward position prior to the stamping operation and then, after the die has been lifted, is moved rearwardly along the length of the strip 90 to separate the strip 90 from the work 138. The stripper 220 is supported and moved by means of parallel arms 226 and 236 which are operated from the cam 234. This arrangement is more fully described in the parent application.

In the use of the machine the operator, after pulling forward on the handle 84 to separate the plates 60 and 64, will insert the desired die 72. Upon releasing the handle to bring the plates 60, 64 into clamping engagement with the die, the operator is assured that the die will be exactly centered in its holder by the clamping mechanism. He will then adjust the paper feed if necessary by turning the screw 116 so that just the required amount of paper strip 90 is fed along at each operation, and, setting the machine in motion by means of the belt shifter 28, he will depress a suitable treadle (not shown) to cause rotation of the drive shaft 24. He will then supply pieces of work successively to the work carrier at the loading station A, controlling their position by means of the gage 130 and allowing them to be clamped in turn on the work carrier by the clamping devices 122 which will carry the pieces of work one by one along half way to the operating station B at the first depression of the treadle and to the operating station B at the next depression of the treadle. Each time the treadle is depressed, the work carrier 120 will move through 90 degrees and thus pieces of work will be carried successively to the operating station B and then to the discharge position C where they will be discharged into the chute 126. At each operation of the die, the stripper 220 will move forward prior to the descent of the die and then rearwardly after the die has been raised and before the work carrier 120 moves, positively to separate the strip 90 from the piece of work 138. The control of the temperature of the die may be effected through the control device 81 and the pressure applied may be controlled by the manipulation of the hand wheel 40. It will be understood that, if desired, the treadle may be maintained in depressed position so that the machine repeats its cycle in rapid succession, provided the operator supplies pieces of work at the loading station as fast as they are taken away by the work carrier 120.

Having described my invention, what I claim as new and desire to secure by Letters Patent of the United States is:

1. In a marking machine having an operating station and a loading station, a depressible work support at the operating station, a marking die, means for moving said die into forcible contact with a piece of work supported on said depressible work support, an annular table extending from the loading station to the operating station notched to receive the work support and rigidly supported at the normal level of said work support, a gage on said table at the loading station substantially diametrically opposite to the operating station for positioning a piece of work with its edge overhanging the inner edge of the annular table, and an intermittently rotatable carrier disposed within said annular table, said carrier being constructed and arranged to grasp said projecting edge of a piece of work and to slide it along the table to the work support to exactly the desired relation to the marking die.

2. In a marking machine, a device for transferring pieces of work from a loading station to an operating station and thence to a discharge station, comprising an annular table upon which said pieces of work are partially supported during the transferring movement, a carrier within said annular table and provided with clamping devices arranged to engage the edges of pieces of work partially supported on said annular table, said carrier being rotatable relatively to said table, and means for operating said clamping devices to grip a piece of work at the loading station and to release the piece of work as it approaches the discharge station.

3. In a marking machine, a device for transferring pieces of work from a loading station to an operating station and thence to a discharge station, comprising a smooth annular table which is interrupted to form a chute at the discharge station, a rotatable carrier within said annular table substantially filling the space inside said table, a clamping device on said carrier, means for operating said clamping device at the loading station to cause it to grip the edge of a piece of work on the table and overlapping the carrier whereby the work is caused to slide along the annular table to the operating station upon rotation of the carrier, and means for releasing said clamping device as it approaches the discharge station upon further rotation of the carrier, whereby a completed piece of work is thrown into said chute by centrifugal force.

4. In a marking machine, a device for transferring pieces of work from a loading station to an operating station and thence to a discharge station, comprising a smooth annular table provided with a delivery chute at the discharge station, a rotatable carrier provided with a clamping device and mounted inside said annular table, and operating mechanism for said carrier constructed and arranged to rotate it intermittently relatively to the table to carry work from the loading station to the operating station and then to the discharge station and to open said clamping device while the carrier is moving to discharge and receive work and to close said clamping device to hold work on the carrier.

5. In a marking machine, a device for transferring pieces of work from a loading station to an operating station and thence to a discharge station, comprising a smooth annular table extending from one to the other of said stations, said annular table being provided with a work stop adjacent to the discharge station, and a rotatable carrier within said annular table and provided with a work-clamping device operable upon intermittent movement of the carrier relatively to the table to transfer a piece of work from the loading station to the operating station and thence to the discharge station, said clamping device being automatically released as said piece of work approaches said stop whereby said piece of work will be taken out of the clamping device by engagement with the stop in case it has not been discharged by centrifugal force.

6. In a marking machine, a device for transferring pieces of work from a loading station to an operating station and thence to a discharge station, comprising an annular table extending from one to another of said stations, a rotatable carrier within said annular table and provided with a work-clamping device adjacent to the periphery of the carrier to grasp the edge of a piece of work overlying said annular table, a work-gaging device on said annular table, at the loading station, whereby the position of a piece of work in said clamping device may be accurately determined, and means for releasing the work-clamping device as it approaches the discharge station to permit the work to be discharged by centrifugal force.

7. A work-presenting device for a marking machine, comprising a movable carrier, a clamping device on said movable carrier, and means constructed and arranged to remain stationary automatically to open said clamping device during the movement of the carrier and arranged to move to close the clamping device while the carrier is stationary.

8. A work-presenting device for a marking machine for transferring pieces of work from a loading station to an operating station and thence to a discharge station, comprising a movable carrier and means for operating said carrier intermittently, a plurality of work-clamping devices on the carrier, and means arranged to remain stationary for releasing the clamping device while the carrier is moving and arranged to move relatively to the carrier for closing the clamping device while the carrier is stationary.

9. A work-presenting device for a marking machine, comprising a carrier rotatable in one direction and arranged to transfer pieces of work from a loading station to an operating station and thence to a discharge station, clamping devices on said carrier, means for rotating said carrier intermittently and constructed and arranged to cause the carrier to pause between its periods of rotation, stationary means arranged to open a clamping device as the carrier approaches the discharge station, and means arranged to move in a direction opposite to the direction of rotation of the carrier to close said opened clamping device at the loading station while the carrier is stationary and just prior to the movement of the carrier to transfer this clamping device away from the loading station.

PERLEY R. GLASS.